United States Patent
Kargilis (10) Patent No.: US 8,984,706 B2
(45) Date of Patent: Mar. 24, 2015

(54) REAR WINDOW WASHER SYSTEM

(75) Inventor: John S. Kargilis, Northville, MI (US)

(73) Assignee: Chrysler Group LLC, B Auburn Hills, MI (US)

( * ) Notice: Subject to any disclaimer, the term of this patent is extended or adjusted under 35 U.S.C. 154(b) by 59 days.

(21) Appl. No.: 13/356,876

(22) Filed: Jan. 24, 2012

(65) Prior Publication Data

US 2013/0185887 A1    Jul. 25, 2013

(51) Int. Cl.
*B60S 1/46* (2006.01)
*B60S 1/58* (2006.01)
*B60S 1/50* (2006.01)

(52) U.S. Cl.
CPC ... *B60S 1/50* (2013.01); *B60S 1/583* (2013.01)
USPC ............... 15/250.01; 15/250.3; 15/250.31; 239/284.1; 239/284.2; 239/130; 224/42.12; 224/42.13; 224/42.14

(58) Field of Classification Search
CPC ............. B60S 1/50; B60S 1/56; B60S 1/566; B60S 1/583; B60S 1/586
USPC ............. 15/250.3, 250.31, 250.05, 250.01; 239/284.1, 284.2; 307/10.1; 224/42.12, 224/42.13, 42.14, 402, 403, 404; 414/463, 414/465, 466
See application file for complete search history.

(56) References Cited

U.S. PATENT DOCUMENTS

| | | | |
|---|---|---|---|
| 3,088,153 A | 5/1963 | Lystad | |
| 3,107,383 A | 10/1963 | Carpenter et al. | |
| 3,112,510 A | 12/1963 | Forbush et al. | |
| 3,671,144 A | 6/1972 | Kuck | |
| 3,978,542 A | 9/1976 | Van Eekelen et al. | |
| 4,090,668 A * | 5/1978 | Kochenour | 239/130 |
| 4,316,303 A | 2/1982 | Penn | |
| 4,353,111 A | 10/1982 | Gallitzendorfer et al. | |
| 4,562,890 A | 1/1986 | Matoba | |
| 5,274,875 A * | 1/1994 | Chou | 15/250.19 |
| 5,647,086 A * | 7/1997 | Gold | 15/250.31 |
| 6,044,517 A * | 4/2000 | Zendler et al. | 15/250.01 |
| 6,266,842 B1 * | 7/2001 | Muller | 15/250.01 |
| 7,216,818 B2 * | 5/2007 | Lee | 239/284.1 |
| 7,246,840 B2 * | 7/2007 | Gates et al. | 296/106 |
| 7,290,306 B2 * | 11/2007 | Wagner | 15/250.3 |
| 7,615,955 B2 * | 11/2009 | Harita et al. | 318/483 |
| 7,797,785 B2 * | 9/2010 | Thibodeau et al. | 15/250.02 |
| 7,895,703 B2 * | 3/2011 | Ina et al. | 15/250.3 |

(Continued)

FOREIGN PATENT DOCUMENTS

| | | |
|---|---|---|
| DE | 10129066 A1 | 12/2002 |
| DE | 102010021572 A1 | 12/2011 |
| FR | 2681019 A1 | 3/1993 |

OTHER PUBLICATIONS

International Search Report and Written Opinion dated Jul. 23, 2013 for International Application No. PCT/US2013/022719, International Filing Date Jan. 23, 2013.

*Primary Examiner* — Gary Graham
*Assistant Examiner* — Michael Jennings
(74) *Attorney, Agent, or Firm* — Ralph E Smith (57) ABSTRACT

A window washer system for a vehicle may include a fluid reservoir and a nozzle. The fluid reservoir may be disposed on an exterior side of a tailgate of the vehicle and may be adapted to store a quantity of window washer fluid. The nozzle may be in fluid communication with the fluid reservoir and may be operable to deposit the window washer fluid onto a rear window of the vehicle. The window washer system may be disposed proximate a spare tire carrier.

14 Claims, 5 Drawing Sheets

(56) References Cited

U.S. PATENT DOCUMENTS

| | | | |
|---|---|---|---|
| 8,020,247 B2 * | 9/2011 | Katou et al. | 15/250.3 |
| 8,052,802 B2 * | 11/2011 | Binfet et al. | 134/18 |
| 8,136,197 B2 * | 3/2012 | Peterson et al. | 15/250.01 |
| 8,157,187 B2 * | 4/2012 | Shank et al. | 239/13 |
| 2004/0142232 A1 | 7/2004 | Risca et al. | |
| 2009/0106927 A1 * | 4/2009 | Binfet et al. | 15/250.12 |
| 2009/0249576 A1 * | 10/2009 | Peterson et al. | 15/250.04 |

\* cited by examiner

REAR WINDOW WASHER SYSTEM

FIELD

The present disclosure relates to a washer system for a window of a vehicle, and more particularly to a rear window washer system.

BACKGROUND

Many vehicles include a windshield washer system including a nozzle configured to spray washer fluid on a windshield of the vehicle and a windshield wiper system configured to wipe moisture, dirt, debris, snow and/or ice off of the windshield. When the windshield becomes at least partially covered with dirt, debris, snow and/or ice, the driver of the vehicle may actuate a pump that causes washer fluid to be sprayed onto the windshield. The wiper assembly may be configured to operate for a predetermined number of passes across the windshield in response to the washer system being actuated to wipe away the washer fluid, dirt, debris, snow and/or ice. In this manner, the washer system and wiper assembly may cooperate to clean the windshield of the vehicle to provide the driver with an unobstructed view through the windshield.

SUMMARY

In one form, the present disclosure provides a window washer system for a vehicle may include a fluid reservoir and a nozzle. The fluid reservoir may be disposed on an exterior side of a tailgate of the vehicle and may be adapted to store a quantity of window washer fluid. The nozzle may be in fluid communication with the fluid reservoir and may be operable to deposit the window washer fluid onto a rear window of the vehicle.

In some embodiments, a spare tire carrier may be attached to the tailgate. At least a portion of the fluid reservoir may be disposed between the spare tire carrier and the tailgate. The fluid reservoir may be mounted to the spare tire carrier. In some embodiments, at least a portion of the fluid reservoir may be disposed below the rear window.

In some embodiments, the tailgate may include a vent through which air from an interior of the vehicle is exhausted. The fluid reservoir may be disposed adjacent the vent.

In some embodiments, the fluid reservoir may include a neck portion having a fill cap disposed thereon. A conduit fluidly coupling the fluid reservoir and the nozzle may be integrally formed with the neck portion.

In some embodiments, a pump may be disposed in a housing or shell defining the fluid reservoir. The pump may be in communication with a switch that provides an electrical connection between an electrical power source and the pump to selectively prevent and allow the nozzle from ejecting window washer fluid.

The vehicle may include a front windshield washer system that is disposed in a front portion of the vehicle. The front windshield washer system may be fluidly isolated from the fluid reservoir, the pump and the nozzle.

The present disclosure also provides a module for a vehicle that may include a housing, a reservoir, a nozzle and a wiper. The reservoir may be disposed within the housing and may be adapted to contain a window washer fluid. The nozzle may extend from the housing and may be in fluid communication with the reservoir. The nozzle may be operable to deposit the window washer fluid onto a rear window of the vehicle. The wiper may extend from the housing and may be operable to wipe the rear window.

Further areas of applicability of the present disclosure will become apparent from the detailed description, claims and drawings provided hereinafter. It should be understood that the detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

In an exemplary embodiment and with reference to FIGS. 1-6, a vehicle 10 is provided that may include a body 11 and a removable cabin-enclosure assembly 12. The body 11 may include a tailgate 14, a front windshield washer system 16, and a rear window washer system 18. As will be subsequently described, the front windshield washer system 16 may be disposed proximate a windshield at a front-end 20 of the vehicle 10, and the rear window washer system 18 may be attached to the tailgate 14 disposed at a rear-end 22 of the vehicle 10. The front windshield washer system 16 and the rear window washer system 18 may operate independently of each other and may be fluidly isolated from each other during operation. Because the front windshield washer system 16 and the rear window washer system 18 are fluidly isolated from each other, the vehicle 10 may not include any fluid supply line extending between the front windshield washer system 16 and the rear window washer system 18. Accordingly, the cabin-enclosure assembly 12 may be quickly and easily removed from and/or installed onto the vehicle 10 by a user (e.g., an owner, driver, passenger, etc.) of the vehicle 10, as desired, without having to disconnect and/or connect, respectively, any fluid supply line or any other conduit to transfer a washer fluid between the front windshield washer system 16 and the rear window washer system 18.

Figure 2:
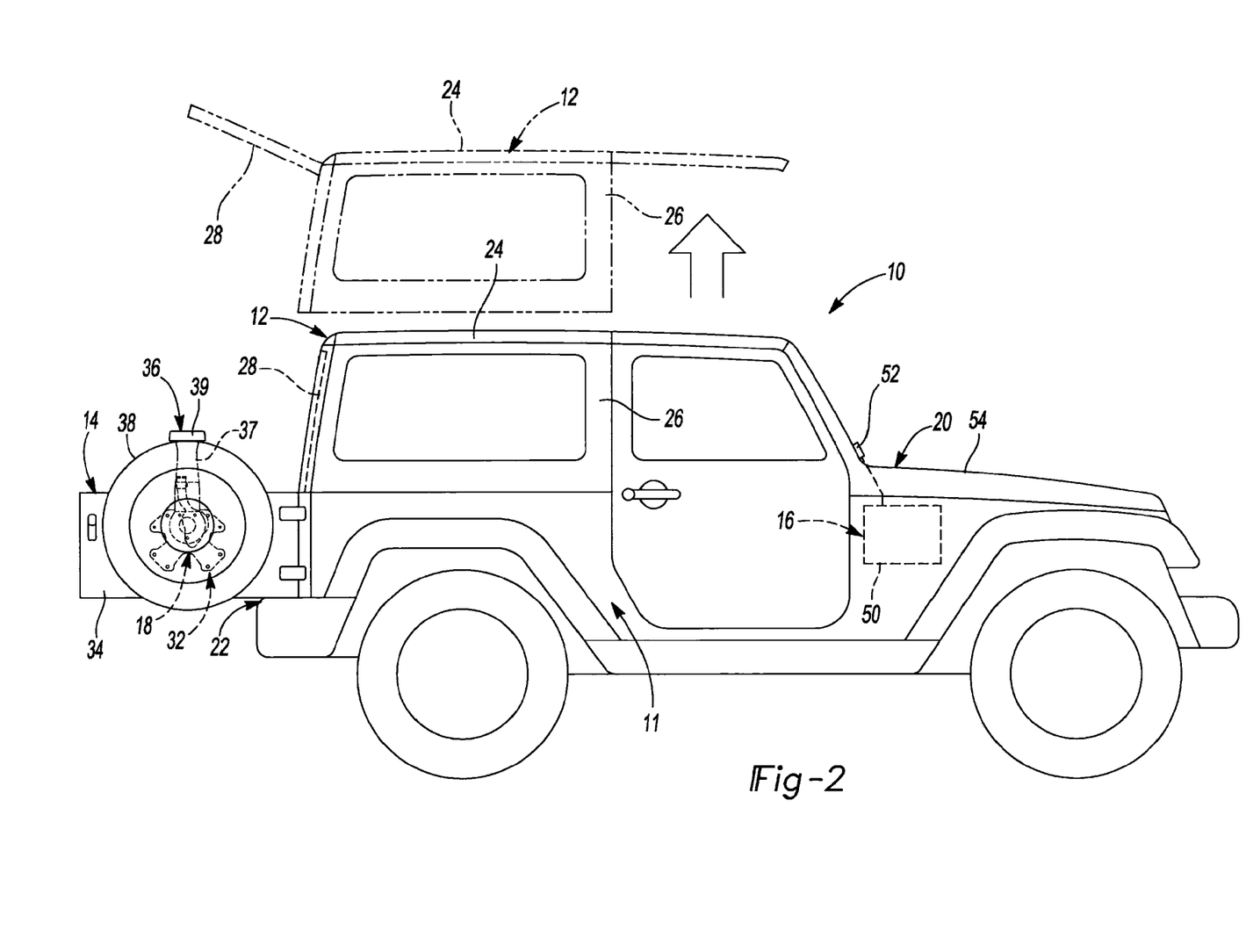
FIG. 2 is a side view of the vehicle of FIG. 1 with a removable roof and a tailgate in an open position.

The cabin-enclosure assembly 12 may include a roof portion 24, side window portions 26, and a rear window 28. The cabin-enclosure assembly 12 may at least partially surround a cabin or interior of the vehicle 10 (shown in FIG. 2 in solid lines). The rear window 28 may be rotatable relative to the roof portion 24 between a closed position (shown in FIG. 2 in solid lines) and an open position (shown in FIG. 2 is phantom lines) to provide access to the interior of the vehicle 10. A user (e.g., the owner, driver, passenger of the vehicle 10) may remove the cabin-enclosure assembly 12 from the vehicle 10 (shown in FIG. 2 is phantom lines) in one or more pieces to provide an open-air environment in the vehicle 10 while the vehicle 10 is in use.

The tailgate 14 may be rotatable relative to the body 11 of the vehicle 10 between a closed position (FIG. 1) and an open position (FIG. 2) to provide access to the interior of the vehicle 10. The tailgate 14 may include a vent 30 (FIG. 3) extending therethrough to allow air within the interior of the vehicle 10 to vent to the ambient air outside of the vehicle 10 when an HVAC (heating, ventilation and air conditioning) system of the vehicle 10 is in a fresh-air mode (in which the HVAC system draws fresh air from outside of the vehicle 10) rather than an air-recirculation mode (in which the HVAC system recirculates the air in the interior of the vehicle 10).

Figure 1:
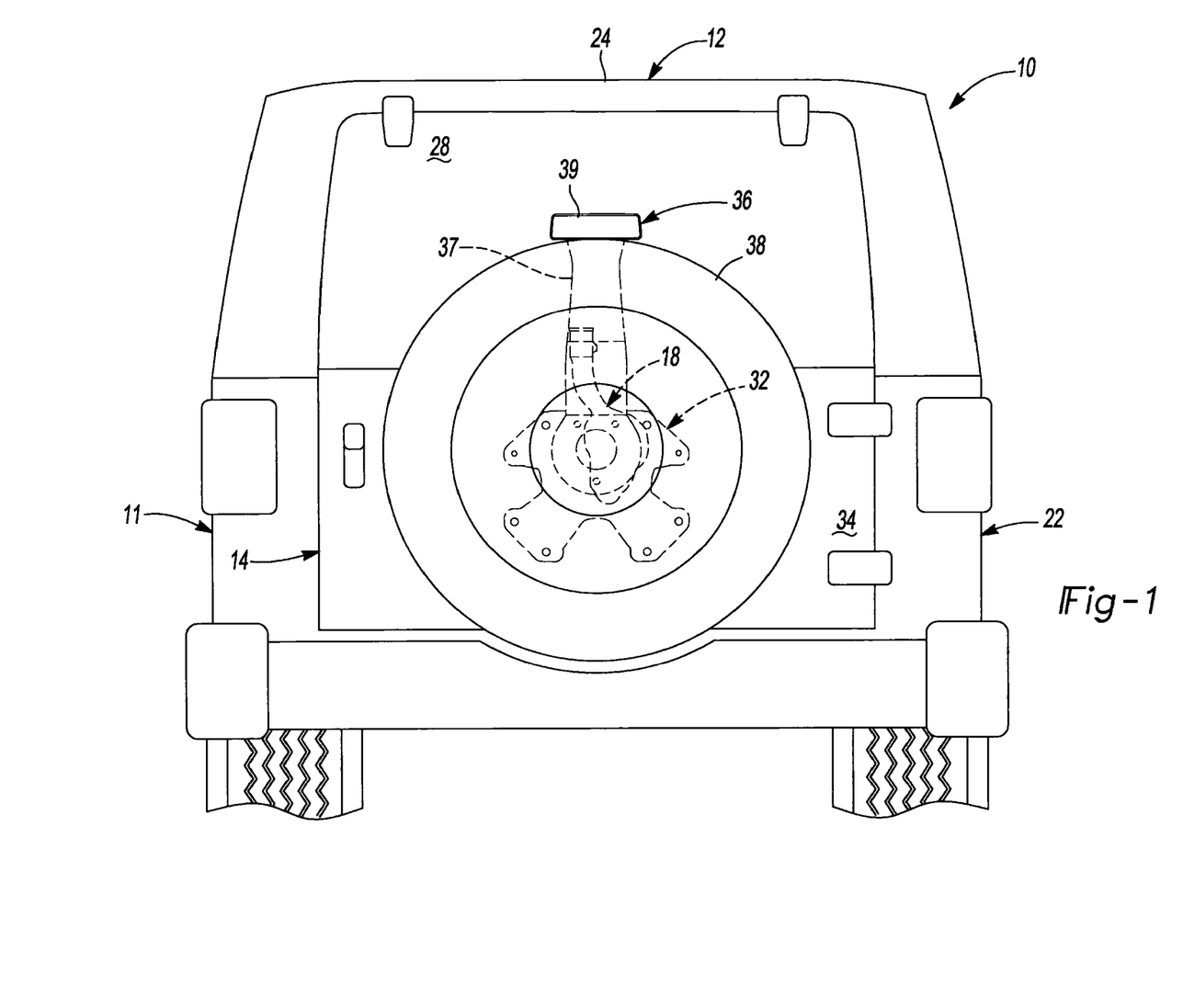
FIG. 1 is a rear view of a vehicle having a window washer system according to the principles of the present disclosure.
Figure 5:
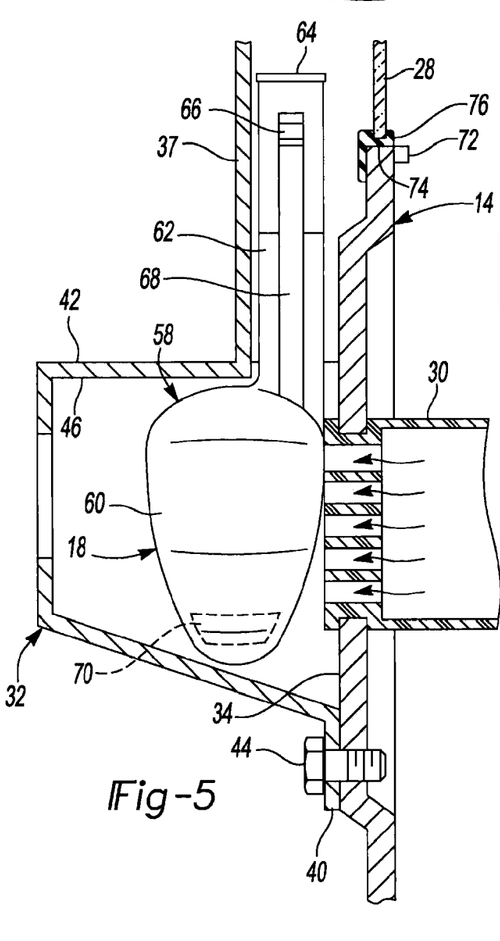
FIG. 5 is a partial cross-sectional view of the tailgate, a spare tire carrier and the window washer system.
Figure 6:
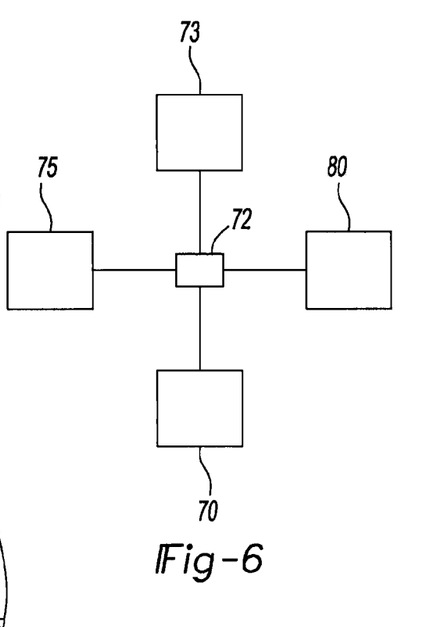
FIG. 6 is a schematic representation of an electrical circuit including a switch according to the principles of the present disclosure.

A spare tire carrier 32 may be mounted to an exterior surface 34 of the tailgate 14. A CHMSL assembly 36 (i.e., a center high-mounted stop lamp assembly) may extend upward from the spare tire carrier 32. The CHMSL assembly 36 may include a tower portion 37 and a lamp 39. In some embodiments, the CHMSL assembly 36 may be integrally formed with the spare tire carrier 32. As shown in FIG. 5, the spare tire carrier 32 may include one or more mounting flanges 40 and a generally hollow hub 42 extending outwardly from the exterior surface 34 of the tailgate 14. The spare tire carrier 32 may be secured to the tailgate 14 by a plurality of fasteners 44 extending through the mounting flanges 40. The hub 42 may define a cavity 46. As shown in FIGS. 1 and 2, a spare tire 38 can be mounted to the hub 42.

A shown in FIG. 2, the front windshield washer system 16 may include a front fluid reservoir 50 and one or more front nozzles 52 in fluid communication with the front fluid reservoir 50. The front fluid reservoir 50 may contain a volume of washer fluid and may supply the washer fluid to the front nozzles 52. The front fluid reservoir 50 may be disposed under a hood 54 of the vehicle 10 in or proximate an engine compartment of the vehicle 10, for example. The front nozzles 52 may extend through the hood 54 of the vehicle 10, or may be disposed in any other suitable location, such as integrated with or proximate one or both front windshield wipers, for example. A pump (not specifically shown) may be in fluid communication with the front fluid reservoir 50 and the front nozzles 52. The pump may be operable to cause washer fluid in the front fluid reservoir 50 to flow through the front nozzles 52 and spray onto the front windshield in response to a user actuating a first control switch in the interior of the vehicle 10.

Figure 3:
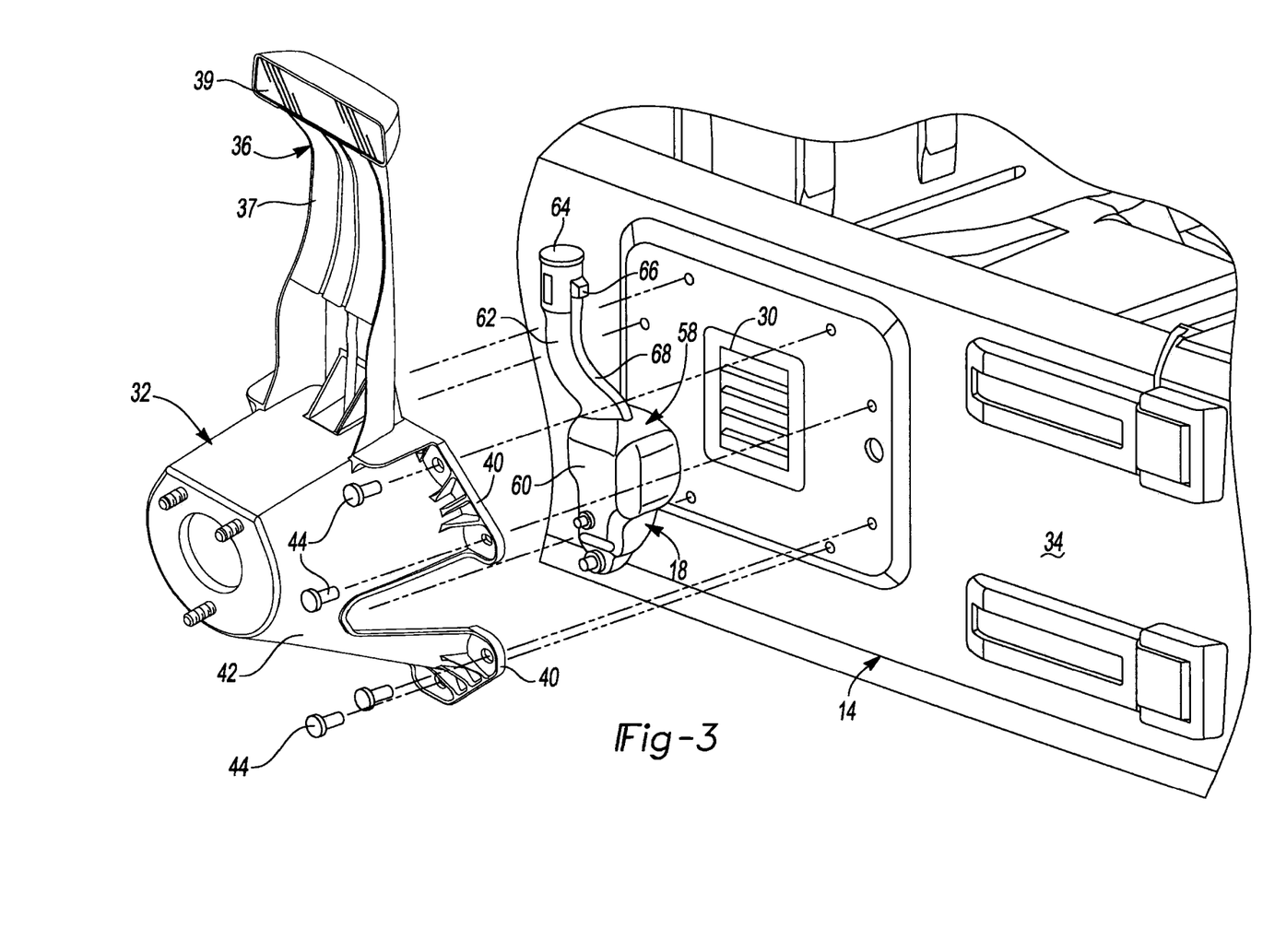
FIG. 3 is an exploded perspective view of the window washer system according to the principles of the present disclosure.
Figure 4:
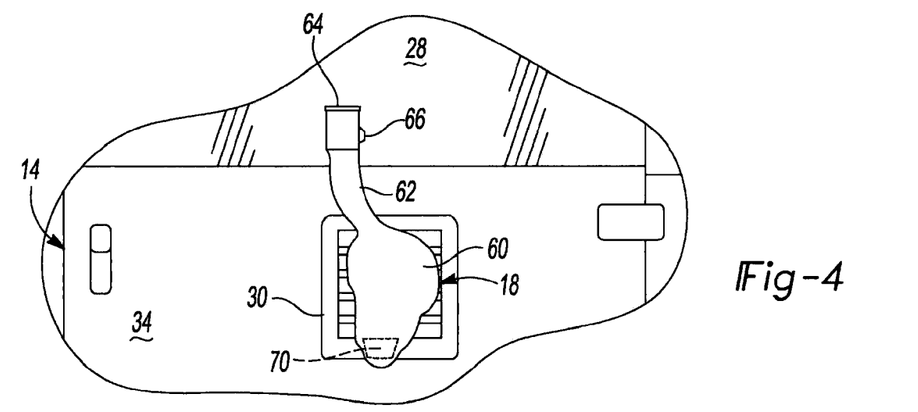
FIG. 4 is a partial view of the tailgate and the window washer system.

The rear window washer system 18 may be disposed between the spare tire carrier 32 and the exterior surface 34 of the tailgate 14, and may be attached to the exterior surface 34 and/or the spare tire carrier 32 in any suitable manner (e.g., via fasteners, snap fit, interference fit, ultrasonic welding, and/or adhesive bonding, etc.). The rear window washer system 18 may be operable to spray a washer fluid onto the rear window 28. The rear window washer system 18 may include a housing 58 defining a rear fluid reservoir 60, a fill neck 62, a fill cap 64, a nozzle 66, a conduit 68, and a pump 70.

The housing 58 can be blow molded, for example, or otherwise formed from a polymeric or metallic material. The rear fluid reservoir 60, fill neck 62, and conduit 68 can be integrally formed with each other. The nozzle 66 can be adhesively bonded and/or pressed into engagement with the conduit 68, for example. The rear fluid reservoir 60 may contain a volume of washer fluid and may be positioned on the tailgate 14 such that it may be in contact with and/or disposed adjacent the vent 30. In this manner, relatively warm air from interior of the vehicle 10 may be exhausted through the vent 30 to warm the rear fluid reservoir 60 to restrict or prevent the washer fluid therein from freezing in cold weather. A portion of the rear fluid reservoir 60 may extend into the cavity 46 of the hub 42 of the spare tire carrier 32.

The fill neck 62 may be a generally tubular member extending upward from the rear fluid reservoir 60 and may be in fluid communication therewith. The fill cap 64 may be disposed on a distal end of the fill neck 62 and may be pivotable relative to the fill neck 62 between a closed position and an open position. A user may selectively open the fill cap 64 to pour washer fluid into the fill neck 62 to fill or refill the rear fluid reservoir 60.

The nozzle 66 may extend from the fill neck 62 at an appropriate position relative to the rear window 28. The conduit 68 may be in fluid communication with the conduit 68 and the rear fluid reservoir 60. The conduit 68 may extend into or near a bottom portion of the rear fluid reservoir 60. In some embodiments, the conduit 68 may be integrally formed with the fill neck 62 or the conduit 68 can be a separate and distinct member extending through an interior of the fill neck 62 or along an exterior of the fill neck 62. While the nozzle 66 is described herein and shown in the figures as being mounted to or integrated with the fill neck 62, in other embodiments, the nozzle 66 could be separated from the fill neck 62 and/or disposed in any other location to enable the nozzle 66 to provide washer fluid to the rear window 28.

The pump 70 may be disposed within the housing 58 and may cause washer fluid in the rear fluid reservoir 60 to flow through the conduit 68, through the nozzle 66 in a predetermined spray pattern, and onto the rear window 28 in response to the user actuating a second control switch in the interior of the vehicle 10. The second control switch may also cause a rear window wiper to actuate a predetermined number of times to wipe the washer fluid and dirt, mud, snow and/or ice off of the rear window 28. In some embodiments, wiring that electrically couples the pump 70 to an electrical power source 73 could be integrated with wiring connecting the lamp 39 of the CHMSL assembly 36 to the electrical power source 73. The electrical power source 73 could include a battery, an electrical generator, and/or a fuel cell, for example.

In some embodiments, a kill switch 72 (shown schematically in FIGS. 5 and 6) may be in electrical communication with the electrical power source 73 and the pump 70. The kill switch 72 may be operable to control a flow of electrical current to the pump 70. The kill switch 72 may be configured to allow electrical current to reach the pump 70 when the removable cabin-enclosure assembly 12 is positioned on the body 11 of the vehicle 10 and the rear window 28 is in the closed position. The kill switch 72 may also be configured to prevent electrical current from reaching the pump 70 when the rear window 28 is in the open position and/or the cabin-enclosure assembly 12 is removed from the body 11 of the vehicle 10. In some embodiments, the kill switch 72 could be disposed at a location proximate an upper end 74 of the tailgate 14 and/or a bottom edge 76 of the rear window 28 so that the kill switch 72 can sense when the rear window 28 is closed and attached to the tailgate 14. In other embodiments, the kill switch 72 could be disposed at any other suitable location and configured in any suitable manner to provide the functionality described herein. In some embodiments, the kill switch 72 could also be configured to selectively electrically couple the electrical power source 73 and a defrost coil 75 (shown schematically in FIG. 6) embedded in the rear window 28. In some embodiments, the kill switch 72 could also be configured to selectively electrically couple the electrical power source 73 and a motor of a rear window wiper assembly 80 (shown schematically in FIG. 6).

As described above, the front windshield washer system 16 and the rear window washer system 18 may be fluidly isolated from each other. Therefore, the vehicle 10 may not include any fluid supply line extending between the front windshield washer system 16 and the rear window washer system 18. Accordingly, the cabin-enclosure assembly 12 may be quickly and easily removed from and/or installed onto the vehicle 10 by the user of the vehicle 10, as desired, without having to disconnect and/or connect, respectively, any fluid supply line or any other conduit to provide a washer fluid from the front windshield washer system 16 to the rear window washer system 18. The lack of a fluid supply line extending between the front windshield washer system 16 and the rear window washer system 18 may also reduce a possibility of washer fluid leakage, reduces components and assembly steps to simplify manufacturing of the vehicle 10.

In some embodiments, the rear window washer system 18 can be preassembled with the spare tire carrier 32, and then assembled onto the vehicle 10 as a module. In this manner, a single parts-supplier could supply such a module to the manufacturer of the vehicle 10, thereby simplifying the manufacturer's supply chain.

Figure 7:
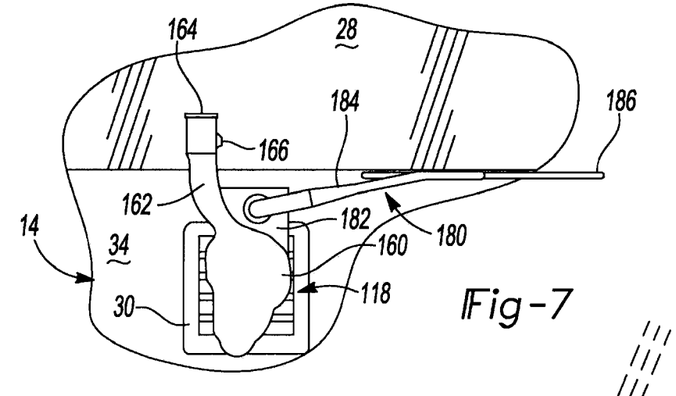
FIG. 7 is a rear view of another embodiment of a window washer system having an integrated wiper according to the principles of the present disclosure.

With reference to FIG. 7, another rear window washer system 118 is provided. The structure and function of the rear window washer system 118 may be substantially similar to that of the rear window washer system 18 described above, apart from any exceptions described below and/or shown in the figures. Briefly, the rear window washer system 118 may include a rear fluid reservoir 160, a fill neck 162, a fill cap 164, a nozzle 166 and a conduit providing fluid communication between the rear fluid reservoir 160 and the nozzle 166. The rear fluid reservoir 160, fill neck 162, fill cap 164, nozzle 166 and conduit may be substantially similar to the rear fluid reservoir 60, fill neck 62, fill cap 64, nozzle 66 and a conduit 68 described above, and therefore, will not be described again in detail.

The rear window washer system 118 may also include an integrated rear window wiper assembly 180. The rear window wiper assembly 180 may include a base 182 integrally formed with the rear fluid reservoir 160 and/or the fill neck 162. A wiper arm 184 may extend from the base 182 and may be rotatable relative thereto. A motor may be disposed in the base 182, for example, that rotatably drives the wiper arm 184 relative to the rear window 28. A wiper blade 186 may be attached to the wiper arm 184 and may be operable to wipe moisture, dirt and/or debris from the rear window 28. In some embodiments, the wiper arm 184 may extend from the fill neck 162. In other embodiments, the wiper arm 184 may extend from the rear fluid reservoir 160. In such embodiments, the motor driving the wiper arm 184 could be disposed inside of a housing defining or integrally formed with the rear fluid reservoir 160, for example. In some embodiments, the wiper arm 184 and/or the wiper blade 186 may be "docked" or positioned on the exterior surface 34 of the tailgate 14 when the rear window wiper assembly 180 is not in use (as shown in FIG. 7). In some embodiments, wiring electrically coupling the motor of the wiper assembly 180 to an electrical power source could be integrated with wiring connecting the lamp 39 of the CHMSL assembly 36 to the electrical power source.

In some embodiments, the kill switch 72 may be configured to allow electrical current to reach the motor of the wiper assembly 180 when the removable cabin-enclosure assembly 12 is positioned on the body 11 of the vehicle 10 and the rear window 28 is in the closed position. The kill switch 72 may also be configured to prevent electrical current from reaching the motor of the wiper assembly 180 when the rear window 28 is in the open position and/or the cabin-enclosure assembly 12 is removed from the body 11 of the vehicle 10.

Figure 8:
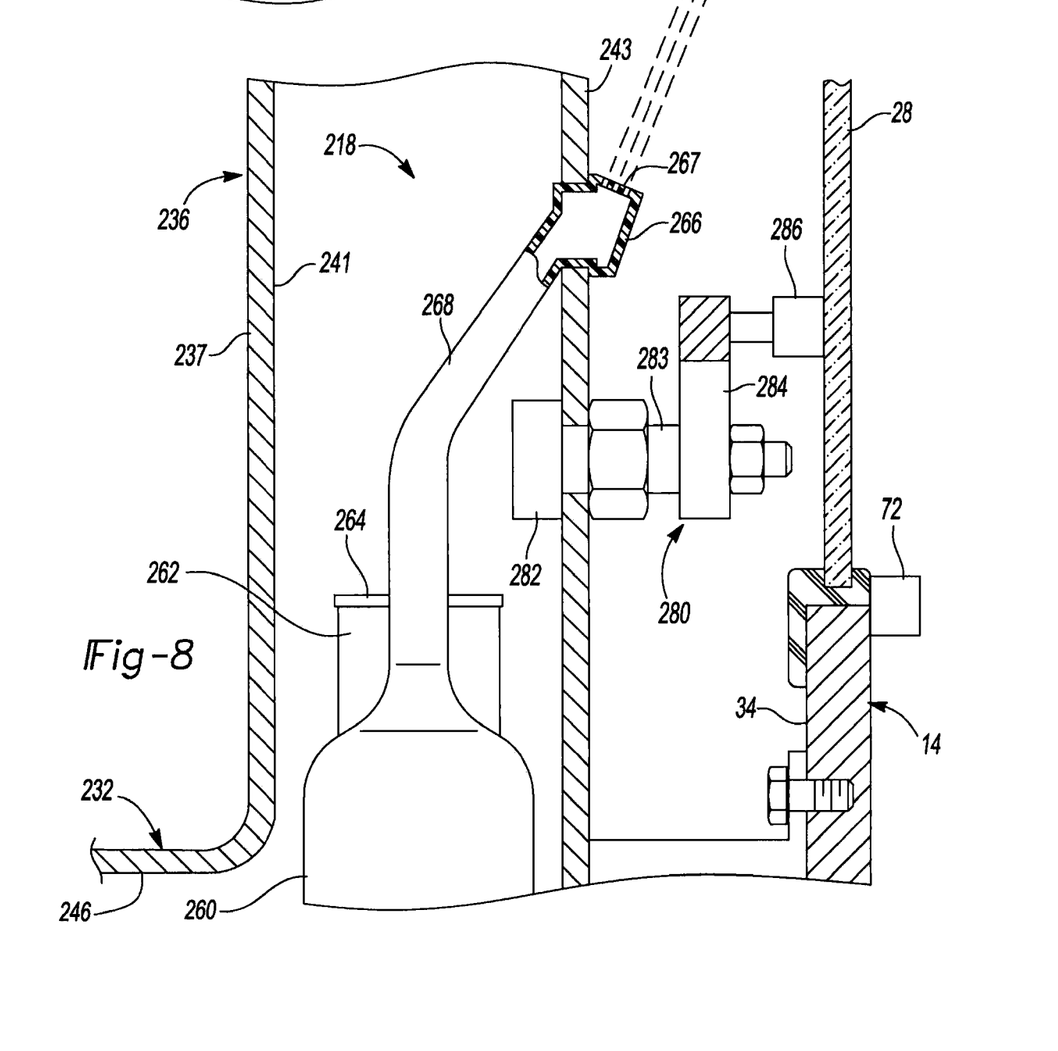
FIG. 8 is a cross-sectional view of yet another embodiment of a window washer system according to the principles of the present disclosure.

With reference to FIG. 8, another rear window washer system 218 is provided. The structure and function of the rear window washer system 218 may be generally similar to that of the rear window washer systems 18, 118 described above, apart from any exceptions described below and/or shown in the figures. The rear window washer system 218 may include a rear fluid reservoir 260, a fill neck or tube 262, a fill cap 264, a nozzle 266, and a conduit 268. The rear window washer system 218 may be mounted to a spare tire carrier 232 and/or a CHMSL assembly 236. The spare tire carrier 232 and CHMSL assembly 236 may be generally similar to spare tire carrier 32 and CHMSL assembly 36 described above, except a tower portion 237 of the CHMSL assembly 236 may be a generally hollow member forming a cavity 241.

The rear fluid reservoir 260 may be housed within the cavity 241 of the tower portion 237 and/or a cavity 246 of the spare tire carrier 232. The fill neck 262 may extend out of the cavity 241 and/or cavity 246 so that the fill cap 264 and fill neck 262 are accessible to the user. The conduit 268 may extend through a portion of the cavity 241 in the tower portion 237 to the nozzle 266. The nozzle 266 may extend through a wall 243 of the tower portion 237 and may include nozzle openings 267 directed toward the rear window 28 so that fluid ejected from the nozzle 266 is sprayed onto the rear window 28. A pump of the rear window washer system 218 may be in communication with the kill switch 72, in the manner described above with reference to the rear window washer system 18. In some embodiments, wiring electrically coupling the motor of the wiper pump of the rear window washer system 218 to an electrical power source could be integrated with wiring connecting the lamp 39 of the CHMSL assembly 36 to the electrical power source.

A wiper assembly 280 may extend from the wall 243 of the tower portion 237 and may include a motor assembly 282, a drive shaft 283, a wiper arm 284, and a wiper blade 286. In some embodiments, wiring electrically coupling the motor of the wiper assembly 180 to the electrical power source could be integrated with wiring connecting the lamp 39 of the CHMSL assembly 36 to the electrical power source.

In some embodiments, the motor assembly 282 may be connected to the electrical power source via the kill switch 72, for example. The kill switch 72 may be configured to allow electrical current to reach the motor assembly 282 when the removable cabin-enclosure assembly 12 is positioned on the body 11 of the vehicle 10 and the rear window 28 is in the closed position. The kill switch 72 may be configured to prevent electrical current from reaching the motor assembly 282 when the rear window 28 is in the open position and/or the cabin-enclosure assembly 12 is removed from the body 11 of the vehicle 10.

The motor assembly 282 may rotatably drive the drive shaft 283, which in turn rotates the wiper arm 284 and wiper blade 286 relative to the rear window 28. While the wiper assembly 280 is shown in FIG. 8 as being disposed in contact with the rear window 28 when the wiper assembly 280 is not in use, in some embodiments, the wiper assembly 280 can be configured and/or positioned such that the wiper blade 286 may be docked on the exterior surface 34 of the tailgate 14, as described above.

What is claimed is:

1. A window washer system for a vehicle comprising:
   a fluid reservoir disposed on an exterior side of a tailgate of the vehicle and adapted to store a quantity of window washer fluid; and
   a nozzle in fluid communication with the fluid reservoir and operable to deposit the window washer fluid onto a rear window of the vehicle,
   wherein a spare tire carrier is attached to the tailgate and the fluid reservoir is mounted to the spare tire carrier such that at least a portion of the fluid reservoir is disposed between the spare tire carrier and the tailgate, and
   wherein the tailgate includes a vent through which air from an interior of the vehicle is exhausted, the fluid reservoir being disposed adjacent the vent for thermal communication therebetween.

2. The window washer system of claim 1, wherein the fluid reservoir includes a neck portion having a fill cap disposed thereon.

3. The window washer system of claim 2, further comprising a conduit fluidly coupling the fluid reservoir and the nozzle, the conduit being integrally formed with the neck portion.

4. The window washer system of claim 1, further comprising a pump disposed in a housing defining the fluid reservoir.

5. The window washer system of claim 4, wherein the pump is in communication with a switch and an electrical power source, the switch being configured to allow electrical current to the pump when a rear window of the vehicle is in a closed position and prevent electrical current from reaching the pump when the rear window is in an open position.

6. The window washer system of claim 4, wherein a front windshield washer system disposed in a front portion of the vehicle is fluidly isolated from the fluid reservoir, the pump and the nozzle.

7. The window washer system of claim 1, further comprising a wiper extending from a member integrally formed with the fluid reservoir.

8. The window washer system of claim 1, wherein at least a portion of the fluid reservoir is disposed below the rear window.

9. A module for a vehicle comprising:
   a housing disposed on an exterior side of a tailgate of the vehicle;
   a reservoir disposed within the housing and adapted to contain a window washer fluid;
   a nozzle extending from the housing and in fluid communication with the reservoir, the nozzle being operable to deposit the window washer fluid onto a rear window of the vehicle; and
   a wiper extending from the housing and operable to wipe the rear window,
   wherein a spare tire carrier is attached to the tailgate and the reservoir is mounted to the spare tire carrier such that at least a portion of the reservoir is disposed between the spare tire carrier and the tailgate, and
   wherein the tailgate includes a vent through which air from an interior of the vehicle is exhausted, the reservoir being disposed adjacent the vent for thermal communication therebetween.

10. The module of claim 9, wherein the reservoir includes a neck portion having a fill cap disposed thereon.

11. The module of claim 10, further comprising a conduit fluidly coupling the reservoir and the nozzle, the conduit being integrally formed with the housing.

12. The module of claim 9, further comprising a pump disposed in the housing and operable to pump window washer fluid from the reservoir through the nozzle.

13. The module of claim 12, wherein the pump is in communication with a switch and an electrical power source, the switch being configured to allow electrical current to the pump when a rear window of the vehicle is in a closed position and prevent electrical current from reaching the pump when the rear window is in an open position.

14. The module of claim 9, wherein at least a portion of the fluid reservoir is disposed below the rear window.

* * * * *